(12) United States Patent
Lombari et al.

(10) Patent No.: US 7,322,488 B2
(45) Date of Patent: *Jan. 29, 2008

(54) EXPANSION TANK WITH DOUBLE DIAPHRAGM

(75) Inventors: Robert Lombari, N Smithfield, RI (US); David van Houten, Stevensville, MI (US)

(73) Assignee: Flexcon Industries Trust, Randolph, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/248,537

(22) Filed: Oct. 12, 2005

(65) Prior Publication Data

US 2006/0131314 A1 Jun. 22, 2006

Related U.S. Application Data

(63) Continuation-in-part of application No. 10/828,980, filed on Apr. 21, 2004, now Pat. No. 7,303,091.

(60) Provisional application No. 60/618,374, filed on Oct. 12, 2004, provisional application No. 60/489,061, filed on Jul. 22, 2003, provisional application No. 60/489,056, filed on Jul. 22, 2003, provisional application No. 60/489,644, filed on Jul. 24, 2003.

(51) Int. Cl.
*B65D 1/32* (2006.01)
*B65D 6/12* (2006.01)

(52) U.S. Cl. .................................. 220/721; 138/30

(58) Field of Classification Search ................ 220/720, 220/721, 723; 285/203, 204, 205; 138/30
See application file for complete search history.

(56) References Cited

U.S. PATENT DOCUMENTS

| | | | | |
|---|---|---|---|---|
| 3,247,999 | A * | 4/1966 | Stilwell | 383/127 |
| 4,595,037 | A * | 6/1986 | LeBreton et al. | 138/30 |
| 4,784,181 | A * | 11/1988 | Hilverdink | 138/30 |
| 5,551,590 | A * | 9/1996 | Mazur et al. | 220/23.83 |
| 6,264,247 | B1 * | 7/2001 | Lombari et al. | 285/202 |
| 2004/0173624 | A1 * | 9/2004 | Carter | 220/720 |

* cited by examiner

*Primary Examiner*—Anthony D. Stashick
*Assistant Examiner*—Harry A Grosso
(74) *Attorney, Agent, or Firm*—Stacy L. Blasberg; Choate, Hall & Stewart, LLP

(57) ABSTRACT

A double-diaphragm bladder. The bladder comprises a non-flexible diaphragm having a peripheral edge and a flexible diaphragm having a peripheral edge. The non-flexible diaphragm has an aperture adapted and constructed to be connected to a liquid port, and the peripheral edges of the non-flexible diaphragm and the flexible diaphragm are sealed together. The bladder is suitable for use in an expansion tank.

22 Claims, 5 Drawing Sheets

EXPANSION TANK WITH DOUBLE DIAPHRAGM

This application claims the priority of U.S. Provisional Application No. 60/618,374, filed Oct. 12, 2004 and also claims priority as a continuation-in-part application of U.S. application Ser. No. 10/828,980, filed Apr. 21, 2004, which claims priority from U.S. Provisional Applications Nos. 60/489,061, filed Jul. 22, 2003, 60/489,056, filed Jul. 22, 2003, and 60/489,644, filed Jul. 24, 2003. The contents of each of these applications are incorporated herein by reference.

BACKGROUND OF THE INVENTION

Expansion tanks are known for use in flow systems for controlling flow of liquid under varying pressures. Generally, expansion tanks comprise an essentially cylindrical or spherical housing containing a bladder-type diaphragm that divides areas of a liquid and a pressurized gas. For a general discussion of expansion tanks and bladder-type diaphragms, see U.S. Pat. No. 4,784,181 to Hilverdink entitled "Expansion Tank with a Bladder-Type Diaphragm".

An expansion tank often has one nozzle through which liquid flows in and out depending on the pressure level controlled by the contraction and expansion of the interior diaphragm. Many municipalities require that expansion tanks for use with potable water include devices to ensure that water circulates through the tank and that there is not actually stagnant water in the tank when the tank is "empty".

SUMMARY OF THE INVENTION

In one embodiment, the invention is an expansion tank. The expansion tank includes an outer shell and a bladder disposed within the outer shell. The bladder includes a non-flexible diaphragm having a peripheral edge and a flexible diaphragm having a peripheral edge. The peripheral edges of the non-flexible diaphragm and the flexible diaphragm are sealed to one another to form a circumferential seam, and a space within the bladder is fluidically isolated from a space between the bladder and the outer shell. The non-flexible diaphragm is welded to the outer shell to at least partially define a path for water to flow into the bladder from outside the tank.

The outer shell may include a first head having a first mating edge and a second head having a second mating edge, and wherein the tank is welded at the first and second mating edges, for example, the first and second mating edges may be welded to one another. In another embodiment, the tank may further include a cylindrical side wall having third and fourth mating edges, and the first mating edge may be welded to the third mating edge while the second mating edge is welded to the fourth mating edge.

The second head may include a wall portion and a threaded insert in interlocking mechanical communication with the wall portion. The non-flexible diaphragm may be welded to the second head, and the path is defined at least in part by the threaded insert. The wall portion may be injection molded around the threaded insert.

The expansion tank may further include an outer layer disposed about the outer shell comprising a substantially continuous winding of glass fiber and an epoxy and/or a charge valve to adjust a pressure in a space between the outer shell and the bladder. The flexible diaphragm may include one or more of polypropylene, Delrin™, Teflon™, nylon, polyalkylene terephthalate, polyformaldehyde, polystyrene, poly(methyl methacrylate), polycarbonate, and poly(hexylisocyanate). The flexible diaphragm may include one or more of isobutylene, polybutadiene, poly(dimethylsiloxane), poly(cis-1,4-isoprene), poly(trans-1,4-isoprene), and thermoplastic elastomers. The tank may further include a grill disposed proximal to an opening of the bladder through which water flows into the bladder.

In another embodiment, the invention is an expansion tank. The tank includes an outer shell, a bladder disposed within the outer shell; wherein the bladder comprises a non-flexible diaphragm having a peripheral edge and a flexible diaphragm having a peripheral edge, wherein the peripheral edges of the non-flexible diaphragm and the flexible diaphragm are sealed to one another to form a circumferential seam, and wherein a space within the bladder is fluidically isolated from a space between the bladder and the outer shell, and an insert disposed in the outer shell, the insert at least partially defining a path for water to flow into the bladder from outside the tank. At least a portion of the outer shell is injection molded around the insert.

The tank may further include a grill disposed proximal to an opening of the bladder through which water flows into the bladder. The insert may be threaded and may include a fiber-reinforced composite.

In another embodiment, the invention is a flow-through connector for a diaphragm tank comprising a bladder having a non-flexible diaphragm and a flexible diaphragm, the flow-through connector providing a path for water to enter the bladder through an orifice in the non-flexible bladder, the orifice being defined by an edge of the non-flexible bladder. The flow-through connector includes a nipple having first and second ends, the first end comprising a plurality of tabs that are manipulable between an insertion position and a securing position to secure the nipple to the non-flexible diaphragm, a first retainer ring fixedly attached to the nipple such that the first retainer ring is disposed outside the bladder when the flow-through connector is installed, a second retainer ring having slots configured to receive the plurality of tabs, and a grommet sized to fit around the nipple between the first and second retainer rings and comprising a groove adapted to receive the edge of the non-flexible diaphragm. In the securing position, the tabs press the second retainer ring towards the first retainer ring to create a seal preventing fluidic communication between an interior and an exterior of the bladder and between an interior of the bladder and a space between the first and second retainer rings. The second retainer ring may include a grill disposed in an interior portion of the ring.

In another embodiment, the invention is a diaphragm tank. The diaphragm tank includes an outer shell, a bladder disposed within the outer shell and comprising a flexible diaphragm and a non-flexible diaphragm, the non-flexible diaphragm having an orifice defined by an edge, and a flow-through connector. The flow through connector includes a nipple having first and second ends, the first end including a plurality of tabs that are manipulable between an insertion position and a securing position to secure the nipple to the bladder, a first retainer ring fixedly attached to the nipple and disposed between the non-flexible diaphragm and the outer shell, a second retainer ring disposed about the nipple and within the bladder, and a grommet disposed between the first and second retainer rings and comprising an annular u-channel disposed about the edge of the orifice in the non-flexible diaphragm. In the securing position, the tabs press the second retainer ring towards the first retainer ring to create a seal preventing fluidic communication between an interior of the bladder and a space between the bladder and the outer shell and a space between the interior of the bladder and a space between the first and second retainer rings.

The annular groove may include a u-channel having a wall and two edge regions defining an open side of the u-channel, wherein a thickness of the two edge regions is greater than a thickness of the wall. The outer shell may be metallic or plastic. The second retainer ring may include a grill disposed in an interior portion of the ring.

BRIEF DESCRIPTION OF THE DRAWING

The invention is described with reference to the several figures of the drawing, in which.

DETAILED DESCRIPTION OF CERTAIN PREFERRED EMBODIMENTS

Figure 1:
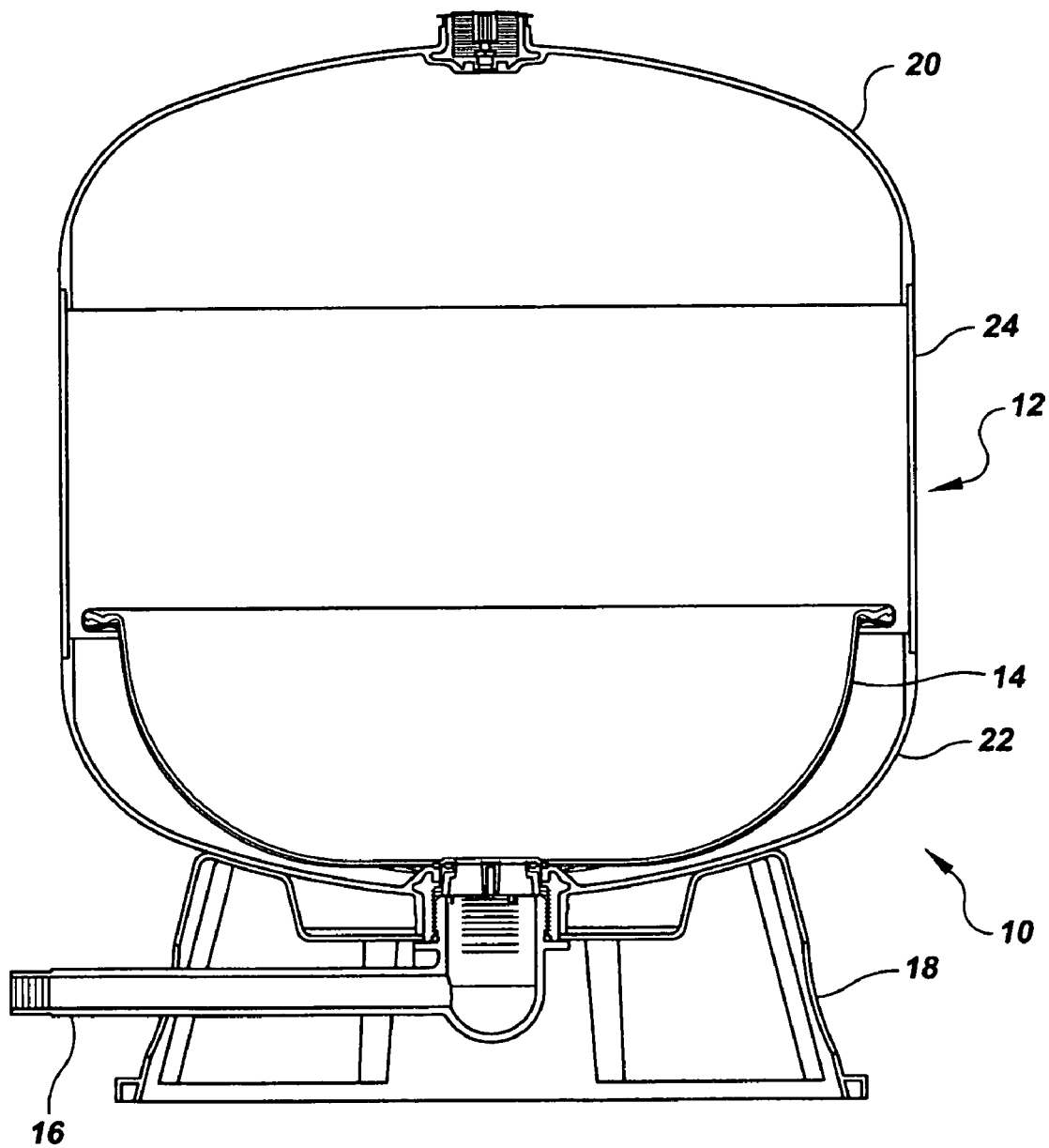
FIG. 1 is a schematic cutaway diagram of a diaphragm tank according to an embodiment of the invention.

FIG. 1 shows an assembled tank 10 according to an embodiment of the invention. The tank 10 includes a shell 12 and bladder 14. Once assembled, tank 10 is connected to water connection 16 and supported by stand 18. Water connection 16 may be constructed of poly(vinyl chloride), steel, or any other suitable material. Stand 18 may be fabricated from polyethylene, steel, or any other suitable material.

Figure 2:
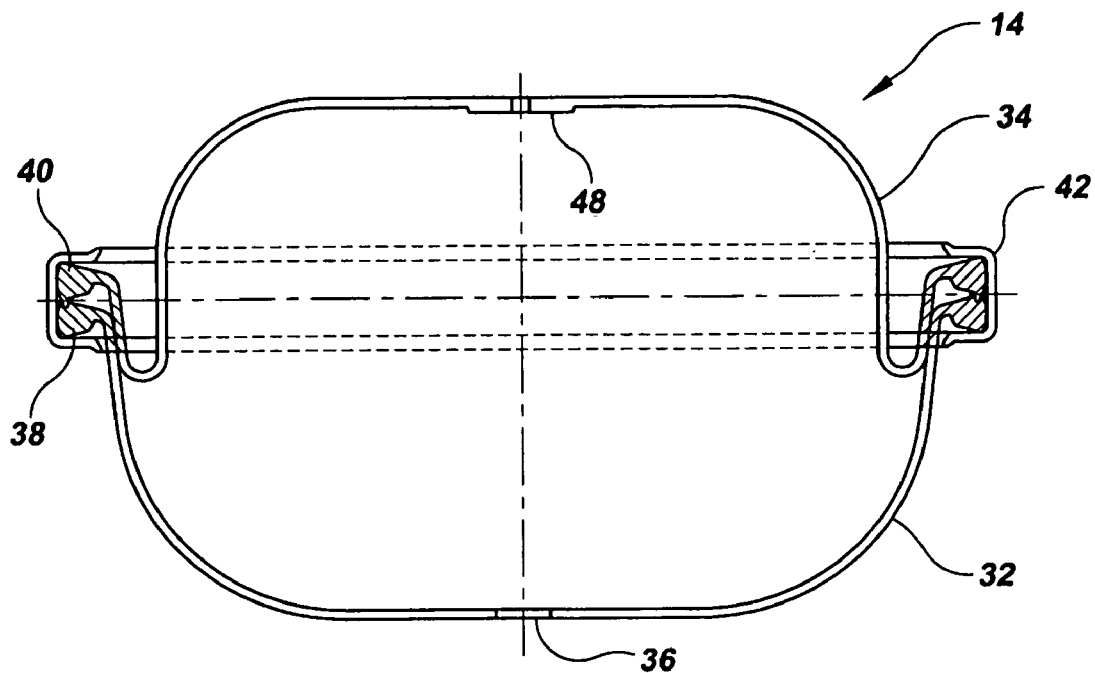
FIG. 2 is a schematic diagram of a particular embodiment of the bladder of the invention.
Figure 3:
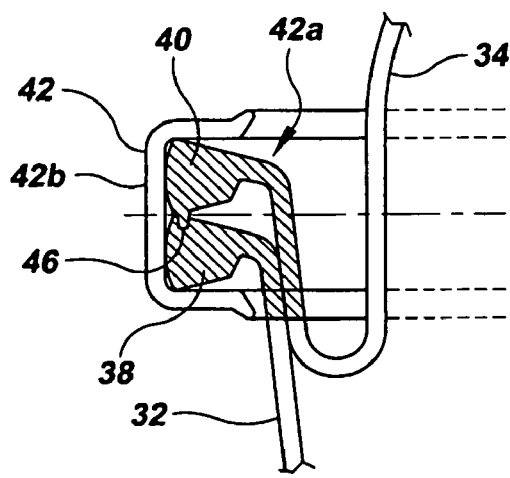
FIG. 3 is an enlarged view of a portion of FIG. 2.
Figure 3A:
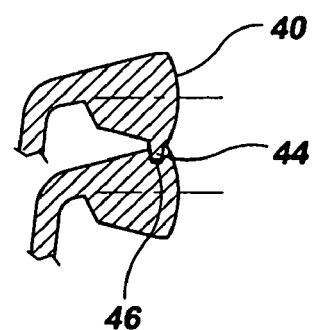
FIG. 3A is an enlarged view of a portion of FIG. 2.

Bladder 14 may be constructed as in U.S. Pat. No. 4,784,181 or in U.S. patent application Ser. No. 10/828,980. In one embodiment, bladder 14 includes a first non-flexible diaphragm 32 and a second flexible diaphragm 34 (FIG. 2). The bladder is also provided with an aperture 36. The peripheral edges 38 and 40 of the first and the second diaphragms, respectively, are connected to each other to form a seal. In the embodiment shown (see also FIG. 3) the peripheral edges 38 and 40, which project to the outside, lie against each other and are clamped together by a clench ring 42. As shown in FIG. 3A the peripheral edge 40 of the flexible diaphragm 34 is provided with a circumferential rib 44 that meshes with a circumferential recess 46 on the peripheral edge 38 of the non-flexible diaphragm 32 in order to obtain a seal. The clench ring may be metallic In an alternative embodiment, the peripheral edges of the non-flexible diaphragm 32 and flexible diaphragm 34 are heat sealed together. In this embodiment, it is not necessary for the peripheral edges of the diaphragms to be clamped together or to have a circumferential rib or groove, although these elements may be used, e.g., to provide reinforcement or ease manufacture.

The non-flexible diaphragm may be produced from a polymer that is relatively stiff. When the bladder 14 is used to hold potable water, the polymer is preferably suitable for use with food or is non-toxic, non-carcinogenic, and non-mutagenic and does not leach such materials into the water. The polymer may be approved for use with food by an appropriate government agency. The polymer may also be resistant to degradation by chlorine, fluorine, ozonated water, sulfur, or other chemicals that may be found in well water or municipal water. In other embodiments, the tank is used in a hot water circulation system, in which potability is not a concern but in which it is more important that the bladder material withstand high temperatures (150-200° F.). Exemplary materials for use in producing the non-flexible diaphragm 32 include but are not limited to polypropylene, Delrin™, Teflon™, nylon, polyalkylene terephthalate, polyformaldehyde, polystyrene, poly(methyl methacrylate), polycarbonate, and poly(hexylisocyanate). Exemplary polypropylene materials for producing the non-flexible diaphragm include P6E5A-004 polypropylene impact copolymer, available from Huntsman.

The second flexible diaphragm may be produced from a resilient, flexible polymer. When the bladder 14 is used to hold potable water, the polymer is preferably suitable for use with food or is non-toxic, non-carcinogenic, and non-mutagenic and does not leach such materials into the water. The polymer may be approved for use with food by an appropriate government agency. The polymer may also be resistant to degradation by chlorine, fluorine, ozonated water, sulfur, or other chemicals that may be found in well water or municipal water. In other embodiments, the tank is used in a hot water circulation system, in which potability is not a concern but in which it is more important that the bladder material withstand high temperatures (150-200° F.). Exemplary materials for use in producing the flexible diaphragm 34 include but are not limited to isobutylene, polybutadiene, poly(dimethylsiloxane), poly(cis-1,4-isoprene), poly(trans-1,4-isoprene), and thermoplastic elastomers.

Figure 4:
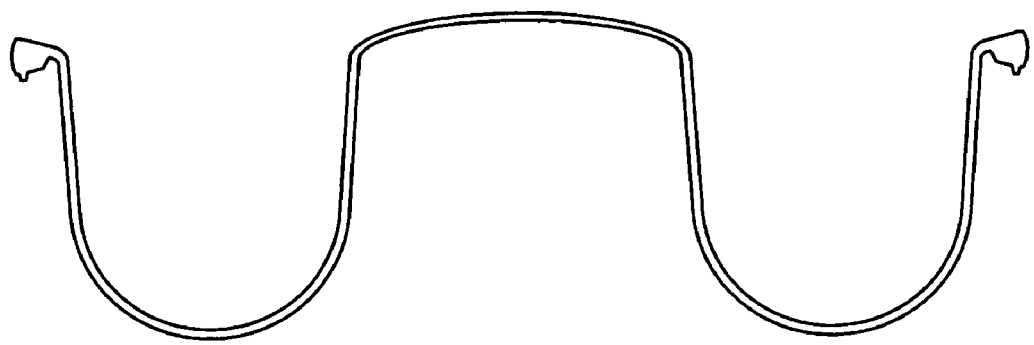
FIG. 4 is a cross-sectional schematic diagram of an alternative embodiment of a flexible component of the bladder.

Flexible diaphragm may be produced in a bowl shape, as shown in FIG. 2, or in an inverted bubble shape, as shown in FIG. 4. The bubble shape facilitates production of flexible diaphragms for narrower, more elongated tanks. Once the bladder and tank are assembled and pressurized, the convex projecting portion of the flexible diaphragm is inverted so that the collapsed bladder takes on the bowl shape shown in Figure x.

The use of polypropylene or similar materials to form non-flexible diaphragm 32 provides several advantages. It prevents rubber from rubbing against rubber in operation, for example, as the bladder expands and deflates. Polypropylene, Teflon, etc., are lubricious, reducing friction as the bladder deflates and expands, extending the life of the bladder and allowing the bladder to be constructed less as a set of paired hemispheres and with more of an oblong shape. This in turn allows the tank to be constructed with a more cylindrical shape, providing increased capacity with a smaller footprint. In addition, the use of a non-flexible diaphragm provides additional stability to the bladder as it expands during use. In larger tanks, the flexible diaphragm does not always expand symmetrically as the bladder is filled. The use of a non-flexible diaphragm prevents the bladder from tipping from side to side in the event of any asymmetry and prevents the compliance of the flexible diaphragm from magnifying initial asymmetries in filling.

Outer shell 12 may be metallic or plastic. An exemplary shell is described in our co-pending U.S. patent application Ser. No. 10/828,980, the entire contents of which are incorporated herein by reference. An alternative shell is described in U.S. Patent Publication No. 2003/0111123, the contents of which are incorporated herein by reference. The shell disclosed in U.S. Pat. No. 4,784,181, the contents of which are incorporated herein by reference, may also be employed, even though it has a different configuration than the shell shown in FIG. 1.

As shown in FIG. 1, shell 12 includes a central portion 24 that defines a side wall of tank 10. Central portion 24 is capped by first head 20 and second head 22 to make an outer shell 12. The two heads 20 and 22 and central portion 24 may be fabricated from metal, for example, steel, or a polymer, for example, polypropylene. Any of the polymers described above for use in the non-flexible diaphragm may be used to form the dome. In addition, because potable water does not come in contact with the dome, it may also be formed from stiff polymers that are not necessarily suitable for use with food. Those skilled in the art will also recognize that outer shell 12 may be formed out of two domes welded together or in other configurations. The bladder 14 sits within outer shell 12. When empty, the pressure of gas between outer shell 12 and bladder 14 causes flexible diaphragm 34 to collapse against non-flexible diaphragm 32.

Figure 5:
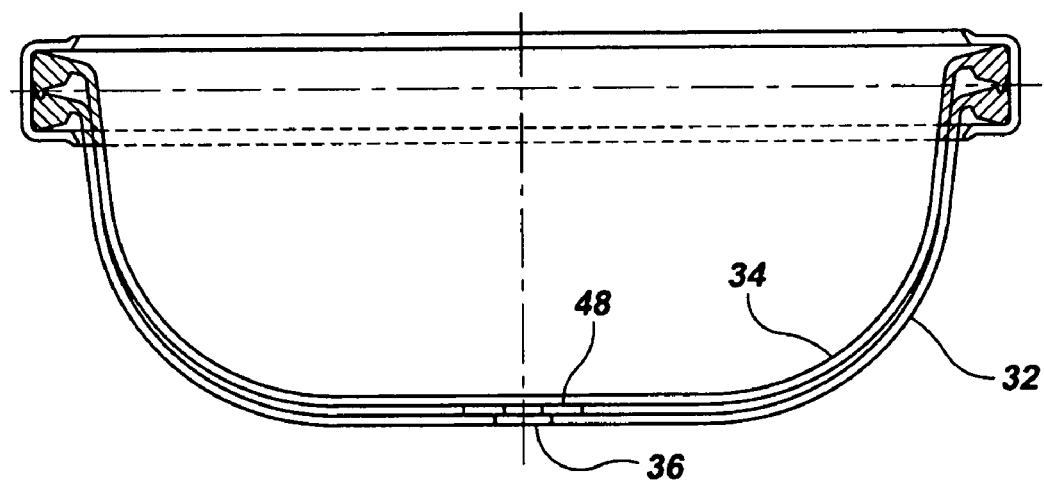
FIG. 5 is a schematic illustration of the bladder depicted in FIG. 2 in its collapsed state.
Figure 5A:
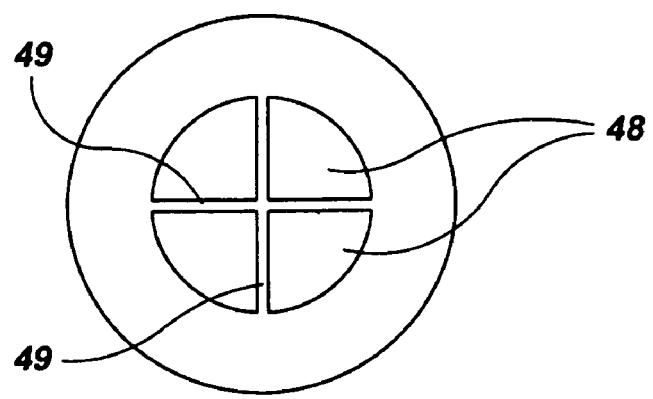
FIG. 5A is a schematic illustration of a portion of the bladder shown in FIG. 2.

In one embodiment, in order to prevent the flexible diaphragm 34 from fully closing the aperture 36 of the non-flexible diaphragm 32 when the liquid is expelled from the bladder 14, the flexible diaphragm 34 is provided on the inside, at the point opposite the aperture 36, with a number of raised pads 48 (FIG. 5A), between which the liquid can flow from the aperture 36 into the bladder through grooves 49. The pads 48 prevent the development of a vacuum between the two diaphragms. FIG. 5B shows the bladder 14 depicted in FIG. 1 in its collapsed state. When liquid enters the bladder 14, it exerts pressure on the inside of the bladder and causes the flexible diaphragm 34 to expand. This expansion compresses the gas in the space between the flexible diaphragm 34 and the outer shell 12. When the liquid pressure inside the bladder 14 is less than the pressure of the gas, the gas expands and pushes against the flexible diaphragm 34, causing it to collapse against non-flexible diaphragm 32 and expel the liquid. The operation of diaphragm expansion tanks is well known to those skilled in the art and is described in U.S. Pat. No. 4,784,181.

To pass into bladder 14, water must pass through an opening in outer shell 12 and aperture 36 of non-flexible diaphragm 32. Through-connector 28 may be constructed as described in U.S. Pat. No. 4,784,181, in U.S. patent application Ser. No. 10/828,980, or in U.S. Pat. No. 6,264,212, the entire contents of all of which are incorporated herein by reference. Through-connector 28 may be sealed to second head 22 by welding, for example, spin-welding (FIG. 2) or by mechanical means. Alternatively or in addition, through-connector 28 may be spin-welded to bladder 14. Those skilled in the art will be familiar with other flow-through attachments that are appropriate for use with the invention.

Figure 6:
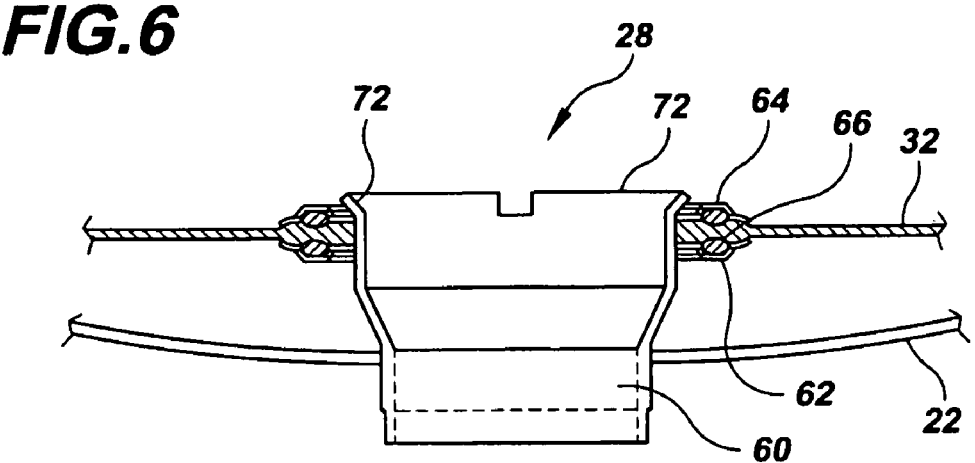
FIG. 6 is schematic diagram of a flow-through nozzle attachment according to an embodiment of the invention.
Figure 6A:
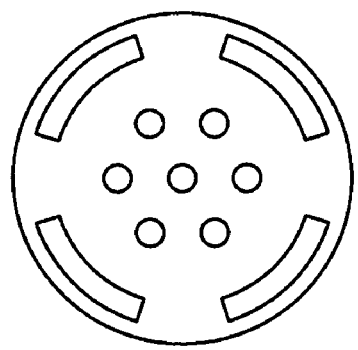
FIG. 6A is a schematic diagram of a grill insert for use with the tank shown in FIG. 1.
Figure 7A:
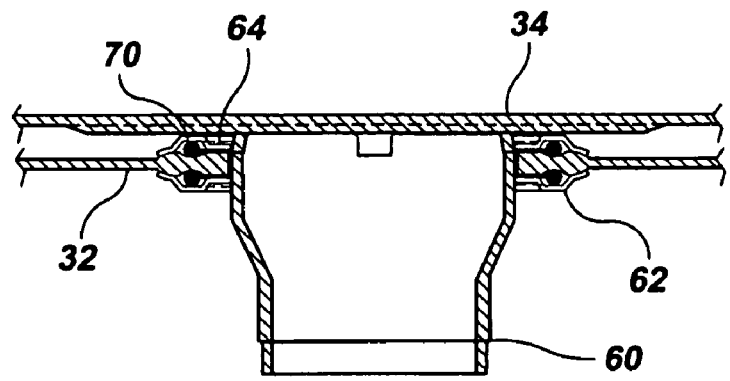
FIG. 7A is a schematic diagram of a flow-through nozzle attachment according to an alternative embodiment of the invention.
Figure 7B:
FIG. 7B is a schematic cross-sectional diagram of a grommet for use with the flow through attachment shown in FIG. 7A.

An exemplary connector is shown in FIG. 6. Nipple 60 extends through non-flexible diaphragm 32 to allow liquid to pass into bladder 14. As shown in FIG. 6A, nipple 60 is positioned to extend through outer shell 12. Within outer shell 12, the nipple 60 further extends through first retainer ring 62 and second retainer ring 64 that secure non-flexible diaphragm 32 therebetween. O-rings 66 may be used as sealing devices at the interfaces of the bladder 14 with first retainer ring 62 and second retainer ring 64. In an alternative embodiment, a grommet 70 is used to provide the seal, as shown in FIGS. 7A and B. The annular u-channel of the grommet 70 prevents water from flowing in the space between non-flexible diaphragm 32 and the exterior of nipple 60 from within the bladder. The edges of the u-channel have a slightly wider width than the walls of the u-channel and provide a seal against leaks between the interior of the bladder 14 and the space between bladder 14 and outer shell 12. The nipple 60 is welded to first retainer ring 62 on the side closest to the outer shell 12. In one embodiment, the o-rings 66 or grommet 70 are made of Viton® and the nipple 60 and retainer rings 62 and 64 are made of stainless steel.

The nipple 60 includes, at one end, at least one tab 72 that may be made of the same material as the nipple 60. Tabs 72 may be an integral portion of nipple 60. The tabs 72 are designed to be manipulable to secure the end of the nipple 60 in place. After insertion of the nipple 60 through the first retainer ring 62, non-flexible diaphragm 32, and second retainer ring 64, the tabs 72 are flared to a position to contact the outer rim of the second retainer ring 64 and to secure the nipple 60 against second retainer ring 64. Once the nipple 60 is in place, liquid can pass through it into bladder 14 without leaking into the space between outer shell 12 and bladder 14. Second retainer ring 64 may also include a grill 74 to prevent extrusion of flexible diaphragm 34 into nipple 60 when the bladder is collapsed (FIG. 6A).

One skilled in the art will recognize that flow-through connector 28 may also be used with prior art bladders and diaphragm tanks, not just the inventive bladders described herein. Flow-through connector 28 may be used to connect an expansion tank, for example, expansion tanks employing bladder 14, to a water supply or circulation system, such as a well system or a hot water supply system.

Figure 8:
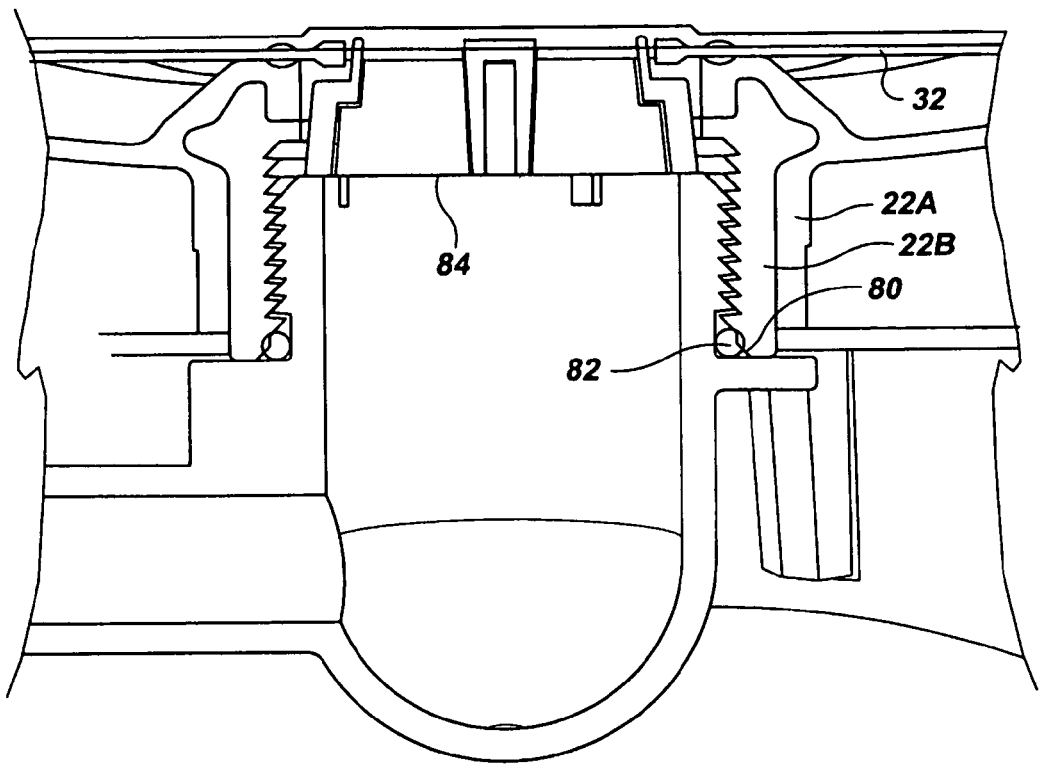
FIG. 8 is a view of a portion of the tank shown in FIG. 1.

In an alternative embodiment, the tank is constructed without a flow-through attachment. Rather, second head 22 is fabricated with a female thread to receive an external water connection 16 (FIG. 8). Where second head 22 is plastic, a wall portion 22a may be injected molded around a threaded insert 22b, which may be prepared from the same material or a fiber reinforced polymer. Indeed, the matrix material of the fiber reinforced insert may be the same polymer as the wall portion 22a of the second head 22. In this embodiment, rather than using a flow-through connector to provide a seal between the bladder and the interior of the shell, non-flexible diaphragm 32 may be welded, for example, by plate welding, plastic welding, or spin welding, to second head 22. The insert 22b may be fabricated with a chamfer 80, for example, at 45°, that can receive an o-ring 82, which provides a seal between external water connection 16 and threaded portion 22b, obviating the use of plumber's caulk or Teflon tape, either of which might shed fragments into the tank that would mix with the water. A grill insert 84 inserted into the threaded insert 22b between non-flexible diaphragm 32 and water connection 16 prevents extrusion of flexible diaphragm 34 into the interior of water connection 16.

Where the bladder is used to hold potable water, it is desirable to promote circulation of water through the bladder 14 so that water enters and leaves the bladder on a "first-in-first-out" (FIFO) basis rather than a "last-in-first-out" (LIFO) basis. Even if the circulation of water is imperfect, that is, water enters and leaves the bladder on some combination of FIFO and LIFO, increased circulation reduces the time that water is resident in the bladder and prevents the water from becoming stagnant. Exemplary flow diverters that may be used to promote water circulation include those disclosed by U.S. Pat. No. 6,343,622, U.S. patent application Ser. No. 10/828,980, and other diverters known to those skilled in the art. In other embodiments, the tank 10 may be employed in a hot water circulation system, for example, for heating a home or other space.

Tank 10 may be assembled by fastening bladder into to second head 22 and then closing central portion 24 and first head 20. Whether the heads and the central portion are metallic or plastic, the components may be welded together. For example, plastic components may be spin welded. One skilled in the art will recognize that one of the heads may be attached to the central portion 24 before fastening bladder 14 to second head 22. If the two heads and the shell are plastic, the assembled tank 10 may be wound with continuous glass fiber and epoxy resin, for example, a mixture of EPON™ and EPIKURE™, both available from Resolution Performance Products, to reinforce the walls. Alternatively, it may be wound as described in U.S. Patent Publication No. 2003/0111123.

Figure 9:
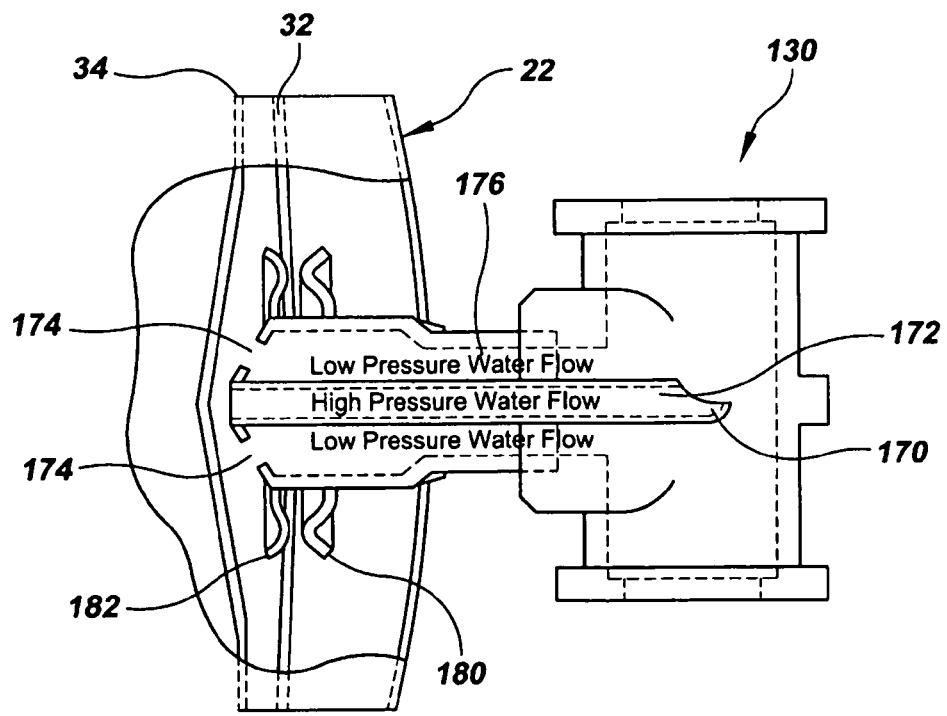
FIG. 9 is a schematic view of a flow-through diverter device according to an embodiment of the invention.

In an alternative embodiment, the bladder 14 is used with a flow diverter 130 as shown in FIG. 9. A flow guidance element 170 of the flow-through diverter device 130 is positioned in a main liquid flow path to face in an upstream direction. In one embodiment, the flow guidance element 170 resembles that of a scooping device.

The flow guidance element 170 establishes the inlet flow passage 172 to divert liquid from the main liquid flow path into the bladder 14. The inlet flow passage 172 is an interior cylindrical shaped passage running along the longitudinal axis of the flow-through diverter device 130. The design of the flow guidance element 170 and inlet flow passage 172 allows a high pressure water flow into the bladder 14.

Water flows out of bladder 14 via discharge inlets 174 through discharge flow passages 176. In one embodiment, the discharge flow passages 176 are arranged circumferentially around the inlet flow passage 172. In another embodiment, flow-through diverter 130 has a single annular discharge flow passage 176 surrounding inlet flow passage 172. A plurality of discharge inlets 174 all direct water into the single discharge flow passage 176. Water passes from the discharge flow passage(s) 176 into the main liquid flow path. The discharge flow passage(s) 176 need not extend as far into the main liquid flow path as inlet flow passage 172.

The upper portions of inlet flow passage 172 and the portions of flow-through diverter 130 that support discharge inlets 174 may be shaped according to a "beehive crown" design, as shown in FIG. 9. This round shape helps flexible diaphragm 34 conform to the opposite surface of bladder 14 when the bladder 14 is empty. The conforming fit of the two diaphragms when flexible diaphragm 34 is pressed against non-flexible diaphragm 32 helps ensure that all water is expelled from the bladder as it empties. Also, the "beehive crown" shape helps water initially entering empty bladder 14 to displace flexible diaphragm 34 away from non-flexible bladder 32.

One skilled in the art will recognize that flow-through diverter 130 may be used with other double-diaphragm tanks besides those disclosed herein. In addition, flow-through diverter 130 may also be used with single-diaphragm tanks.

As shown in FIG. 9, flow-through diverter 130 provides an alternative flow-through mechanism to flow-through connector 28. Retainer elements 180 and 182 secure flow-through diverter 130 to non-flexible diaphragm 32.

Other embodiments of the invention will be apparent to those skilled in the art from a consideration of the specification or practice of the invention disclosed herein.

What is claimed is:

1. An expansion tank, comprising:
an outer shell; and
a bladder disposed within the outer shell, wherein the bladder comprises a non-flexible diaphragm having a peripheral edge and a flexible diaphragm having a peripheral edge, wherein the peripheral edges of the non-flexible diaphragm and the flexible diaphragm are sealed to one another to form a circumferential seam, and wherein a space within the bladder is fluidically isolated from a space between the bladder and the outer shell,
wherein the non-flexible diaphragm is welded to the outer shell to at least partially define a path for water to flow into the bladder from outside the tank.

2. The expansion tank of claim 1, wherein the outer shell comprises a first head having a first mating edge and a second head having a second mating edge, and wherein the tank is welded at the first and second mating edges.

3. The expansion tank of claim 2, wherein the first and second mating edges are welded to one another.

4. The expansion tank of claim 2, further comprising a cylindrical side wall having third and fourth mating edges, and wherein the first mating edge is welded to the third mating edge and the second mating edge is welded to the fourth mating edge.

5. The expansion tank of claim 2, wherein the second head comprises a wall portion and a threaded insert in interlocking mechanical communication with the wall portion.

6. The expansion tank of claim 5, wherein the non-flexible diaphragm is welded to the second head, and wherein the path is defined at least in part by the threaded insert.

7. The expansion tank of claim 5, wherein the wall portion is injection molded around the threaded insert.

8. The expansion tank of claim 1, further comprising an outer layer disposed about the outer shell comprising a substantially continuous winding of glass fiber and an epoxy.

9. The expansion tank of claim 1, further comprising a charge valve to adjust a pressure in a space between the outer shell and the bladder.

10. The expansion tank of claim 1, wherein the non-flexible diaphragm comprises one or more of polypropylene, acetol, polytetrafluoroethylene, nylon, polyalkylene terephthalate, polyformaldehyde, polystyrene, poly(methyl methacrylate), polycarbonate, and poly(hexylisocyanate).

11. The expansion tank of claim 1, wherein the flexible diaphragm comprises one or more of isobutylene, polybutadiene, poly(dimethylsiloxane), poly(cis-1,4-isoprene), poly(trans-1,4-isoprene), and thermoplastic elastomers.

12. The expansion tank of claim 1, further comprising a grill disposed proximal to an opening of the bladder through which water flows into the bladder.

13. An expansion tank, comprising:
an outer shell;
a bladder disposed within the outer shell; wherein the bladder comprises a non-flexible diaphragm having a peripheral edge and a flexible diaphragm having a peripheral edge, wherein the peripheral edges of the non-flexible diaphragm and the flexible diaphragm are sealed to one another to form a circumferential seam, and wherein a space within the bladder is fluidically isolated from a space between the bladder and the outer shell; and an insert disposed in the outer shell, the insert at least partially defining a path for water to flow into the bladder from outside the tank, wherein at least a portion of the outer shell is injection molded around the insert.

14. The expansion tank of claim 13, further comprising a grill disposed proximal to an opening of the bladder through which water flows into the bladder.

15. The expansion tank of claim 13, wherein the insert is threaded.

16. The expansion tank of claim 13, wherein the insert comprises a fiber-reinforced composite.

17. A flow-through connector for a diaphragm tank comprising a bladder having a non-flexible diaphragm and a flexible diaphragm, the flow-through connector providing a path for water to enter the bladder through an orifice in the non-flexible bladder, the orifice defined by an edge of the non-flexible bladder, the flow-through connector comprising:

a nipple having first and second ends, the first end comprising a plurality of tabs, wherein the tabs are manipulable between an insertion position and a securing position to secure the nipple to the non-flexible diaphragm;

a first retainer ring fixedly attached to the nipple such that the first retainer ring is disposed outside the bladder when the flow-through connector is installed;

a second retainer ring having slots configured to receive the plurality of tabs; and a grommet sized to fit around the nipple between the first and second retainer rings and comprising a groove adapted to receive the edge of the non-flexible diaphragm, wherein, in the securing position, the tabs press the second retainer ring towards the first retainer ring to create a seal preventing fluidic communication between an interior and an exterior of the bladder and between an interior of the bladder and a space between the first and second retainer rings.

18. The flow-through connector of claim 17, wherein the second retainer ring comprises a grill disposed in an interior portion of the ring.

19. A diaphragm tank comprising:

an outer shell;

a bladder disposed within the outer shell and comprising a flexible diaphragm having a peripheral edge and a non-flexible diaphragm having a peripheral edge, wherein the peripheral edges of the non-flexible diaphragm and the flexible diaphragm are sealed to one another to form a circumferential seam, and wherein a space within the bladder is fluidically isolated from a space between the bladder and the outer shell, and further wherein the non-flexible diaphragm has an orifice defined by an edge; and a flow-through connector, the flow through connector comprising:

a nipple having first and second ends, the first end comprising a plurality of tabs, wherein the tabs are manipulable between an insertion position and a securing position to secure the nipple to the bladder;

a first retainer ring fixedly attached to the nipple and disposed between the non-flexible diaphragm and the outer shell;

a second retainer ring disposed about the nipple and within the bladder; and a grommet disposed between the first and second retainer rings and comprising an annular u-channel disposed about the edge of the orifice in the non-flexible diaphragm, wherein, in the securing position, the tabs press the second retainer ring towards the first retainer ring to create a seal preventing fluidic communication between an interior of the bladder and a space between the bladder and the outer shell and a space between to interior of the bladder and a space between the first and second retainer rings.

20. The diaphragm tank of claim 19, wherein the annular groove comprises a u-channel having a wall and two edge regions defining an open side of the u-channel, wherein a thickness of the two edge regions is greater than a thickness of the wall.

21. The diaphragm tank of claim 19, wherein the outer shell is metallic or plastic.

22. The diaphragm tank of claim 19, wherein the second retainer ring comprises a grill disposed in an interior portion of the ring.

* * * * *